March 11, 1924.

M. H. BLANK ET AL 1,486,122

WHEEL

Filed July 3, 1919

INVENTORS
M. H. Blank
A. H. Edgerton
By Ray J. Gehr
ATTORNEY

March 11, 1924.

M. H. BLANK ET AL

WHEEL

Filed July 3, 1919   2 Sheets-Sheet 2

1,486,122

INVENTORS
M. H. Blank
A. H. Edgerton
By Ray S. Gehr
ATTORNEY

Patented Mar. 11, 1924.

1,486,122

UNITED STATES PATENT OFFICE.

MERTON H. BLANK AND ARTHUR H. EDGERTON, OF CLEVELAND, OHIO, ASSIGNORS, BY MESNE ASSIGNMENTS, TO ALUMINUM MANUFACTURES, INCORPORATED, OF CLEVELAND, OHIO, A CORPORATION OF DELAWARE.

WHEEL.

Application filed July 3, 1919. Serial No. 308,483.

*To all whom it may concern:*

Be it known that we, MERTON H. BLANK and ARTHUR H. EDGERTON, citizens of the United States, residing at Cleveland, in the county of Cuyahoga and State of Ohio, have invented certain new and useful Improvements in Wheels, of which the following is a specification, reference being had therein to the accompanying drawings.

This invention relates to wheels for road vehicles and our improvements are especially useful as applied to wheels for motor trucks or other vehicles designed to carry heavy loads.

One object of the invention is to produce a metal wheel in which great strength and light weight are combined.

Another object of the invention is to devise a metal wheel in which the material is formed and disposed in such manner that the wheel can readily be cast from metals having the characteristics of aluminum alloys.

A further object of the invention is to devise a hub and bearing construction especially suited for use with metals cast of aluminum alloys or other metal that is relatively soft in comparison with iron.

Another object of the invention is to provide a metal wheel with an improved felly and rim construction in which said felly and rim are cast in one with the web or body of the wheel.

Other objects more or less ancillary to the foregoing, and the manner in which the various objects are attained, will be pointed out in the following description.

In the accompanying drawings, which show preferred forms of construction embodying the invention, Figure 1 is a side elevation of one of our improved wheels fitted with a pneumatic tire.

Figure 1:
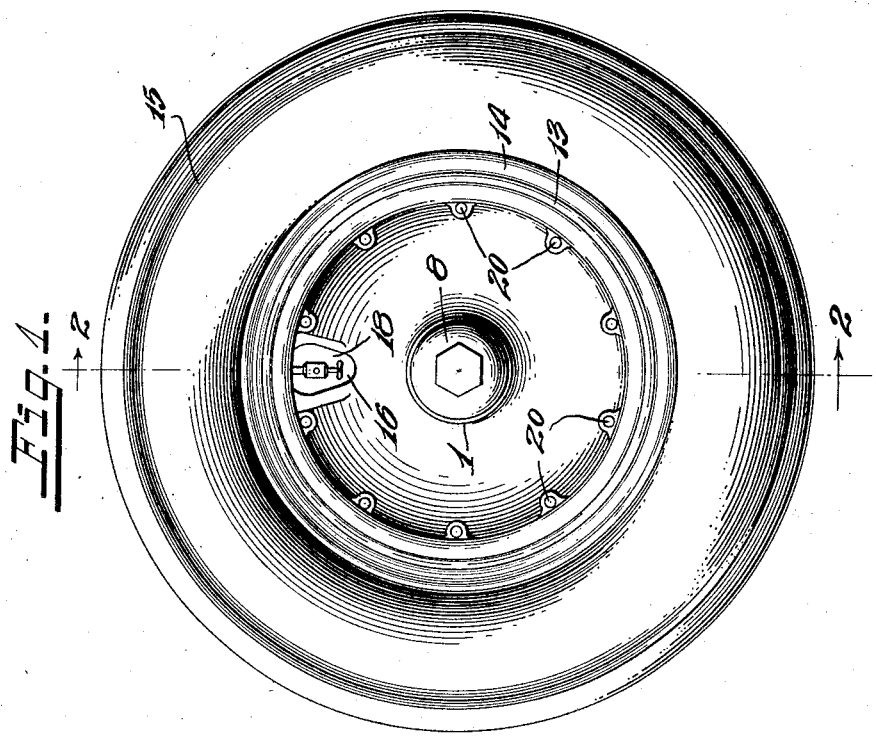
Figure 2:
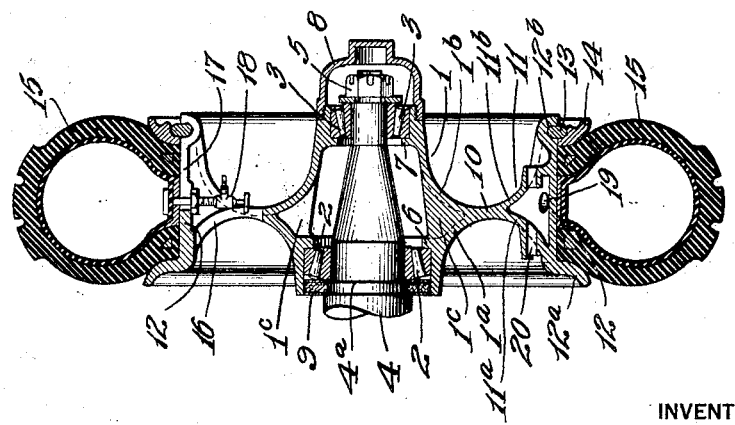
Fig. 2 is a section on the line 2—2, Fig. 1.

Referring first to the wheels shown in Figs. 1 and 2, 1 is a wheel hub which is formed at its inner and outer ends to receive antifriction bearings 2 and 3, respectively, of well known construction. The bearings 2 and 3 receive a fixed axle 4 upon which the wheel is secured by a nut 5. The nut 5 abuts the end of the inner race of bearing 3 and a shoulder $4^a$ on the axle 4 similarly abuts the inner race of the bearing 2. In addition, the wheel hub 1 is formed interiorly with annular flanges 6 and 7 which abut the inner ends of the outer races of the bearings 2 and 3, respectively. Thus provision is made for axial thrust in both directions. The outer end of the hub is threaded to receive a cap 8. 9 is a packing ring consisting preferably of a heavy washer of felt or the like between two thin metal washers, the latter being pressed upon the axle 4.

The hub 1 is formed with inside and outside sections $1^a$, $1^b$ which converge outwardly and join the inner edge of a web 10. The hub structure is strengthened by a circumferential series of ribs $1^c$. At its outer edge this web shows what, by analogy, may be termed the wheel felly 11. This felly comprises inner and outer sections $11^a$, $11^b$ which diverge outwardly to form a wide base for the wheel rim. The wheel hub 1, the web 10 and the felly 11 are cast in one. The wheel rim may be cast in one with the felly or may be formed separately. In the wheel shown in Figs. 1 and 2 the rim 12 is cast in one with the felly 11, the structure thus formed being substantially triangular in radial section. At its inner side the rim 12 has an integral tire flange $12^a$ and at its outer side said rim is formed with a groove $12^b$ to receive the locking ring 13 for the removable tire flange 14. The wheel is thus adapted to receive a large pneumatic tire 15 of the cord type. The felly of the wheel is cut away at 16 and the wheel rim 12 is formed with a slot 17 to accommodate the tire valve 18. The wheel rim 12 may be formed with a circumferential series of core openings 19.

A wheel of the character described can be driven in any suitable manner but, in the construction shown, the felly of the wheel is formed with a circumferential series of bolt holes 20 to permit the attachment of a driving sprocket or gear.

We preferably cast our improved wheel of an aluminum alloy suitable for the purpose, and we thus secure a wheel which is remarkably light. At the same time, ample strength is secured by the manner of forming the hub and felly parts of the wheel. It will be noted in this connection that the load applied through the bearings 2 and 3 is very effectively sustained by the inner and outer converging hub sections 1ª and 1ᵇ and directly transmitted through said sections to the web 10, and also that the load or stress is in a similar manner effectively and directly transmitted from the web 10 through the diverging felly sections 11ª and 11ᵇ to the rim 12.

Furthermore, it is possible with our form of construction to make the thickness of the cast sections very uniform so that difficulties, which would otherwise be encountered in the casting of aluminum alloys, are obviated.

The hub cap 8 may, of course, be formed of aluminum and the tire flange 14 and the locking ring 13 may be formed either of aluminum alloy or other metal.

Figure 3:
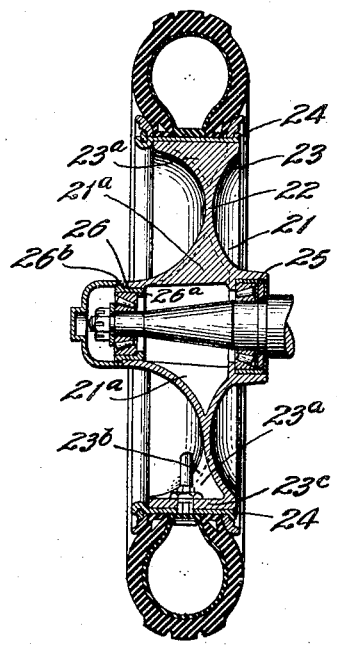
Fig. 3 is a section corresponding to that of Fig. 2 through a wheel of a modified form of construction.

In Fig. 3 is shown a wheel designed for use as the front wheel of a truck. In this case the hub 21, web 22 and felly 23 are cast in one, but the wheel is provided with a separate steel rim 24 which is designed to be applied to the felly with a forced fit. The inner and outer sections of the hub are strengthened, as in the case of the first form of construction, by internal ribs 21ª, and as the inner and outer sections of the felly 23 are not in this case tied together by the rim, the felly is provided with a circumferential series of transverse ribs 23ª. The felly has its outside section cut away at 23ᵇ and is at this point provided with a peripheral wall 23ᶜ to receive the tire valve as shown.

The hub of the wheel is provided at its inner end with a steel sleeve 25 which forms a seat for the inner bearing. And, similarly, the outer end of the wheel hub is formed with a steel sleeve 26 to form a seat for the outer bearing. The sleeve 26 is preferably formed with an internal flange 26ª to take the axial thrust in one direction and is also formed with an external flange 26ᵇ that is threaded to receive the hub cap.

The sleeves 25 and 26 can be secured in the hub by casting the hub around them, or they may be forced into the respective ends of the hub, or the hub may be heated before inserting the sleeves so as to secure them with a shrink fit.

The wheel shown in Fig. 3 is designed to be cast of a suitable aluminum alloy and it has the advantages in that respect noted in connection with the first form of construction. We have shown the wheel hub in this case provided with steel sleeves to serve as seats for the bearings as it may be found desirable in some cases to protect the relatively soft aluminum alloy from the shocks transmitted through the bearings and thus avoid rupture or deformation of the wheel hub which might, in extreme cases, result. By the use of the steel sleeves the stresses incident to severe shocks are more evenly distributed.

Figure 4:
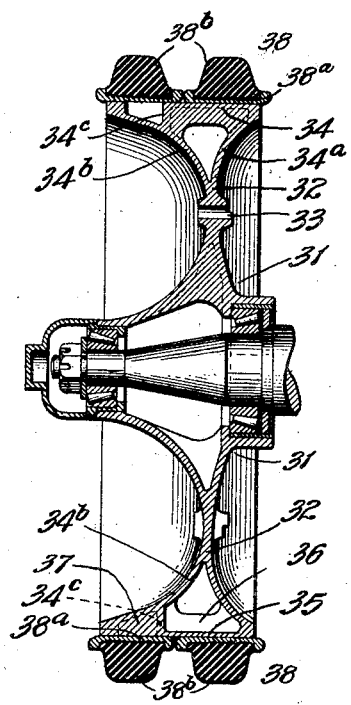
Fig. 4 is a sectional view through a wheel of still another form of construction.

The wheel shown in Fig. 4 is designed for use as the rear driving wheel of a heavy truck.

The construction of the hub 31 and its bearing is of substantially the same character as that shown in Fig. 3. The web 32 of the wheel is formed with bolt holes 33 for the attachment of a driving sprocket or gear and the felly 34 is formed with diverging inner and outer sections as in the above described forms of construction. In the present case, however, the felly, because of its great width, is formed with a circumferentially extending rib 34ᶜ which springs from the outer section 34ᵇ of the felly. This rib is tied to the inner section 34ª by a rim section 35 and a series of transverse ribs 36. The structure is further strengthened by means of a circumferential series of transverse ribs 37.

As shown, the wheel is provided with a pair of solid tires 38 which consist of steel base rings 38ª upon which the rubber treads 38ᵇ are vulcanized in the well known manner. The tires are placed upon the wheel with a forced fit, the inner tire base ring engaging the rim section 35, while the outer tire base ring engages both the rim section 35 and the outer periphery of the felly section 34ᵇ.

As in the case of the two other forms of construction above described, the loads or stresses are effectively and directly sustained and transmitted by the wheel structure by virtue of the outwardly converging walls or sections of the hub and the outwardly diverging sections of the felly.

Figure 5:
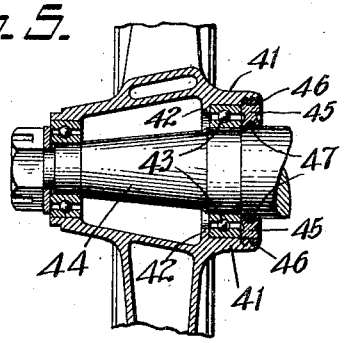
Fig. 5 is a sectional view, partly broken away, through a spoke type wheel equipped with antifriction bearings.
Figure 6:
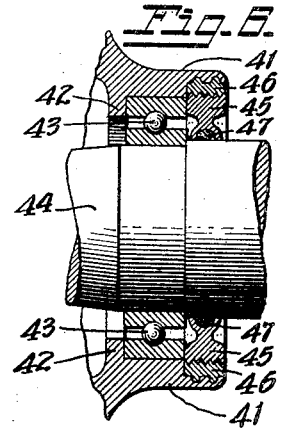
Fig. 6 is a fragmentary axial section through the inner end of a wheel hub showing a modified form of hub and bearing construction.

In Figs. 5 and 6 we show an alternative form of construction for the inner end of the wheel hub. In this construction the hub 41 is provided at its inner end with an annular flange 42 to take the axial thrust in one direction of the outer race of a ball bearing 43. The inner race of this bearing is mounted with a forced fit on an axle 44 and at its inner side abuts a shoulder on the axle as shown.

The outer race of the bearing preferably fits the hub 41 rather snugly but in addition it is positively secured in position in the hub by means of a securing ring 45. This ring is threaded on its outer periphery to fit a threaded hard metal sleeve 46 which is preferably secured to the hub by casting the hub of aluminum alloy on the ring. The sleeve 46 can be formed with projections as shown which are deeply embedded in the metal of the hub and serve to anchor the sleeve very securely. With this construction the screw threads of both members are formed in hard metal and ample strength is attained without making the threads unduly heavy. The inner periphery of the retaining ring 45 is formed with a groove to receive a packing 47 of felt or the like.

With this form of hub and bearing construction it will be seen that axial thrust in both directions is transmitted to and from the hub through the inside bearing of the wheel. Consequently the outer end of the hub need not be provided with flanges or the like to take thrust, but the outer race of the outside bearing may simply be mounted in the hub with a snug fit.

We wish it understood that we do not limit our invention to the specific forms of construction which have been shown and described, except as indicated in the claims which follow.

What we claim is:

1. A cast metal wheel having a hub with outwardly converging inside and outside sections, an annular web joining the converging hub sections at their junction, a felly with inside and outside disc sections diverging outwardly from their junction with the outer edge of the web, said hub, web and felly parts being cast in one, and a metal rim surrounding the felly and engaging directly with the said diverging sections, the rim and felly forming a hollow structure substantially triangular in radial section.

2. A metal cast wheel having a hub with outwardly converging inside and outside sections, an annular web joining the converging hub sections at their junction, a felly with inside and outside disc sections diverging outwardly from their junction with the outer edge of the web, and a metal rim surrounding the felly and engaging directly with the said diverging sections, said hub, web, felly and rim being cast in one and the felly and rim forming a hollow structure substantially triangular in radial section.

3. A metal cast wheel having a hub with outwardly converging inside and outside sections, an annular web joining the converging hub sections at their points of junction, a felly with inside and outside disc sections diverging outwardly from their junction with the outer edge of the web, and a metal rim surrounding the felly and engaging directly with the said diverging sections, and formed with tire retaining means, said hub, web, felly and rim being cast in one and said felly and rim forming a hollow structure substantially triangular in radial section.

4. A traction wheel for a vehicle having a hub section cast from a metal relatively soft in comparison with iron, and hard metal sleeves fixed in the inner and outer ends of the hub to form seats for antifriction bearing races.

5. A traction wheel for a vehicle having a cast metal hub section composed of an aluminum alloy, and hard metal sleeves fixed in the inner and outer ends of the hub to form seats for the antifriction bearing races.

6. A traction wheel for a vehicle having a cast metal hub section composed of an aluminum alloy, and steel sleeves fixed in the hub to form seats for the antifriction bearing races.

In testimony whereof we hereunto affix our signatures.

MERTON H. BLANK.
ARTHUR H. EDGERTON.